United States Patent Office 2,757,216
Patented July 31, 1956

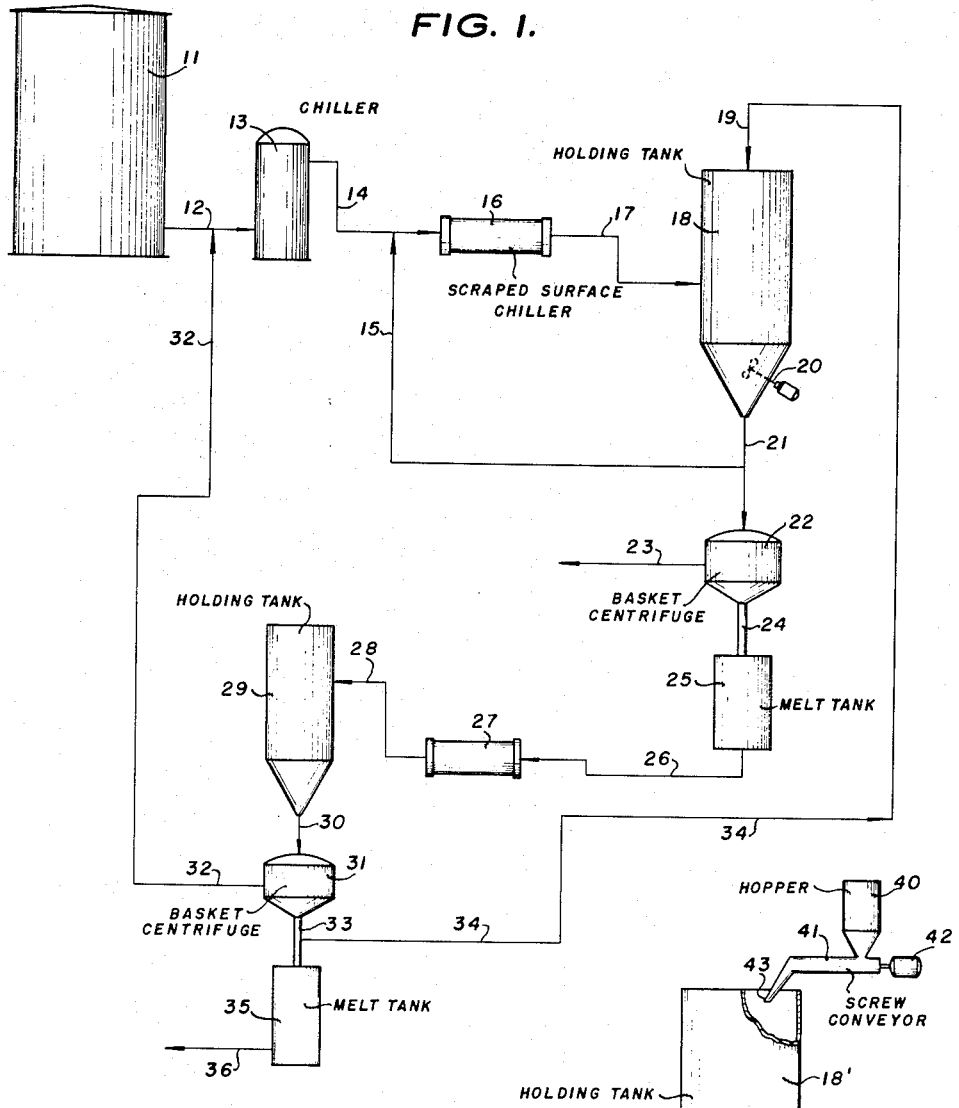

2,757,216

SEEDING AND FILTER AID TECHNIQUE FOR PARAXYLENE PRODUCTION

Raymond A. Speed and Rufus B. Bennett, Baytown, Tex., assignors, by mesne assignments, to Esso Research and Engineering Company, Elizabeth, N. J., a corporation of Delaware Application May 23, 1952, Serial No. 289,502

7 Claims. (Cl. 260—674)

The present application is directed to a process for recovering high purity paraxylene from a mixture containing paraxylene and at least one other isomeric xylene.

As a specific example, in the petroleum refining art it is possible by subjecting fractions to hydroforming and then to distillation to obtain a mixture of isomeric xylenes in which the paraxylene is present in an amount of about 16% by volume.

The present invention is directed to a simple, efficient crystallization procedure for recovering paraxylene in substantially pure form from a feed stock containing a low concentration of paraxylene, for example 12 to 25% by volume.

The process of the present invention may be described briefly as follows:

A feed stock having a paraxylene content in an amount within the range of about 12 to 25% by volume contaminated by at least one other isomeric xylene is chilled to a temperature close to but above the temperature at which paraxylene crystals form. The chilled feed stock is then admixed with a slurry of substantially the same paraxylene content but at such a temperature that the resultant mixture is at a temperature below the crystallization temperature of paraxylene. The chilled mixture is then further cooled in a scraped surface heat exchanger and introduced into a holding tank into which large paraxylene crystals are introduced, the large crystals serving as seed crystals and filter aid. From the holding tank, slurry is removed and a portion is used as the slurry for admixture with feed stock previously described and the remainder sent to a first separating step where a filtrate and first filter cake are formed. The first filter cake is further purified in the second stage which involves melting the filter cake to form a melt and recrystallizing paraxylene crystals in the melt which are then separated as a second filter cake in a second separating stage. The high concentration of paraxylene in the second stage results in large paraxylene crystals in the second separating step and it is preferred to use some of these crystals for the crystals introduced into the holding tank in the first stage while the remainder are withdrawn from the system as desired high paraxylene concentration product.

The invention will be further described by reference to the drawing in which Fig. 1 is in the form of a flow sheet illustrating a preferred mode for carrying out the present invention; and Fig. 2 is an enlarged view showing in greater detail the features of the holding tank of Fig. 1.

Turning now specifically to the drawing, 11 designates a charge tank containing a liquid mixture of hydrocarbons which may contain ethylbenzene, paraxylene, metaxylene and orthoxylene. An analysis of a typical feed stock for the process of the present invention is given in the following table:

TABLE

| Component | Volume percent by infrared analysis |
|---|---|
| Toluene | 2.0 |
| Ethylbenzene | 19.2 |
| Paraxylene | 15.7 |
| Metaxylene | 42.2 |
| Orthoxylene | 20.9 |

The feed stock from tank 11 is withdrawn through line 12 and passed through chiller 13 where it is chilled to a temperature close to but above its normal crystal point. The outlet temperature of chiller 13 may be within the range of −35 to −55° F. with −40° F. being satisfactory. From chiller 13 the mixture is withdrawn through line 14 and is admixed with a paraxylene slurry having such a temperature that the resultant admixture has a temperature approximately 10° F. below the normal crystal temperature. Preferably the admixture is within the temperature range of −65 to −75° F. The mixture passes into scraped surface chiller 16 where its temperature is reduced approximately an additional 30° F. and in the range of −95° to −105° F. and discharged through line 17 into holding tank 18. For practical reasons (such as to maintain plant investment costs as low as possible and still obtain good results) it is preferred to hold the slurry within the holding tank 18 for an average time within the range of 30 minutes to 3 hours although greater times may be used if desired and will in fact encourage larger crystal growth.

Within holding tank 18 crystal growth is encouraged by the addition of seed crystals through inlet 19 and preferably by stirring the contents as by the use of a mechanical stirrer means 20. Holding tank 18 is preferably maintained at substantially the outlet temperature of scraped surface chiller 16 although it will be understood that due to heat losses to the atmosphere its temperature may be a few degrees higher than the outlet temperature of chiller 16.

From the holding tank slurry is withdrawn through outlet line 21 and the stream split, with a portion passing through branch line 15 as recycle slurry for admixture with the chilled feed stock in line 14 and the remainder passed to first separating step 22. In the drawing first separating zone 22 is illustrated as being carried out in a basket type centrifuge but it will be obvious that other types of separating means may be employed as, for example, a filter. In separating zone 22 the slurry is separated into a filtrate which is removed through outlet line 23 and a filter cake which is removed through outlet 24 and passed to melt tank 25 where it is melted. The melt from melting tank 25 is passed through a second crystallizing and separating step.

The melt is withdrawn from melting tank 25 through line 26 and passed to a second scraped surface heat exchanger 27 where it is chilled to a temperature within the range of 15 to −15° F. and discharged through line 28 to holding tank 29. It is preferred to hold the slurry in holding tank 29 an average time within the range of 30 minutes to two hours. From holding tank 29 the slurry is withdrawn through line 30 to a second separating zone 31. In the drawing, second separating zone 31 is illustrated as carried out in a basket type centrifuge but it will be obvious that other separating means, such as a filter, may be employed. From second separating zone 31 a filtrate is withdrawn through line 32. Since the filtrate contains a substantial amount of paraxylene it will usually be found desirable to return it to the first stage and in the drawing line 32 shown for discharging into line 12 for admixture with fresh feed stock. The filter cake from separating step 31 is withdrawn through outlet 33. Preferably a portion is withdrawn for addition to holding tank 18 and in Fig. 1 this is diagrammatically illustrated by line 34 which connects to inlet 19. The remainder of the cake is passed to melt tank 35 where it is melted and is withdrawn through outlet line 36 as a high purity paraxylene product.

Referring now to Fig. 2, which shows in greater detail the features of the holding tank, apparatus are provided for conducting the present invention. Actually, while a line 34 is shown in Fig. 1 for recycling crystals as explained, this is for illustrative purposes only and except on a very large scale it will probably be more convenient to transport the crystals batchwise and introduce them into holding tank 18. In Fig. 2 a means is illustrated for introducing seed crystals into the holding tank. In Fig. 2 holding tank 18' is provided with a stirrer 20 identical to that of Fig. 1. Arranged at the top of holding tank 18' is means for introducing the crystals including a crystal hopper 40 and screw conveyor 41 powered with prime mover 42 discharging through spout 43 into holding tank 18'.

By way of specific example in the operation of the process shown by Fig. 1, the feed stock may be chilled to a temperature of −40° in heat exchanger 13, admixed with recycle slurry having a temperature of −95° F. which is introduced by line 15 with a recycle ratio of recycle slurry to fresh feed within the range of 2:1 to 20:1 and preferably in the ratio of 10 parts of recycle to one part of feed. Slurry at a temperature of −95° F. is withdrawn from scraped surface heat exchanger 16 and discharged into holding tank 18. The slurry is held in holding tank 18 and average time of two hours. Large seed crystals are introduced into holding tank 18 in an amount within the range of 5% to 20% of the cake separated in stage 22, and preferably in the amount of 10%. The paraxylene cake obtained in separating step 22 contains approximately 75% paraxylene and after being melted in tank 25 is chilled to 0° F. in heat exchanger 27 and is held in holding tank 29 for an average time of one hour at 0° F. From separating step 21 a filter cake having a paraxylene content of 95% or greater is obtained and the filtrate having a paraxylene content of approximately 43% is separated and returned to the first crystallization stage.

The advantages of using the procedure of the present invention over a procedure where no crystals are introduced into the holding tank as seed are shown by the following examples in which Example I describes the results obtained when no seed was used and Example II describes a procedure in accordance with the present invention where crystals from a second separating step were introduced as seed into the holding tank.

*Example I*

A feed stock consisting of approximately 15.7% paraxylene, 42.2% metaxylene, 20.9% orthoxylene, 19.2% ethylbenzene and 2% toluene was initially chilled to a temperature of −40° F. and mixed with recycle slurry at a temperature of −95° with a recycle rate, slurry to fresh feed, of 20:1 and then chilled in a scraped heat exchanger at −95° F. and discharged into a holding tank where it is held at an average residence time of 2 to 4 hours with slurry being withdrawn from the holding tank as recycle slurry. The slurry in the holding tank had an average crystal size of 210 microns long and 30 microns wide with many crystal fines present. Slurry from the holding tank was centrifuged with a centrifuge spin time of 60 seconds and was found to have a centrifuge drain rate of 52 lbs./sq. ft. screen area/minute and the resultant cake had a 75 weight per cent product purity of paraxylene.

*Example II*

The feed stock having the same composition as used in Example I was subjected to the same chilling conditions with the exception that paraxylene seed crystals having an average size of 270 by 360 microns in size, with many larger crystals present, were introduced into the holding tank batchwise in an amount equivalent to 10% of the filter cake being separated. When slurry from the holding tank was centrifuged with the centrifuge spin time of 60 seconds, the centrifuge drain rate was found to be 70 lbs./sq. ft. screen area/minute with a paraxylene product purity of 75 weight per cent.

It will be seen that by the use of the seed technique that the centrifuge drain rate was increased from 52 lbs./sq. ft. screen area/minute in the first example where there was no seeding to 70 lbs./sq. ft. screen area/minute in the second example which employed seeding in accordance with the present invention.

While we have disclosed a particular mode for carrying out the present invention, it will be obvious to a workman skilled in the art that various changes may be made without departing from the scope of the invention.

We claim:
1. A process for separating paraxylene from a feed stock consisting of a liquid mixture of hydrocarbons including paraxylene in the range of 12 to 25% by volume and the isomers thereof including ortho and metaxylenes and ethylbenzene which comprises the steps of chilling feed stock to a temperature in the range of −35° to −55° F. close to but above its crystallization temperature, admixing said chilled feed stock with a slurry of substantially the same composition and at a lower temperature in the range of −65° to −75° F. to form an admixture having a temperature approximately 10° F. below the crystallization temperature of said feed stock, passing said admixture through a scraped surface heat exchanger and there reducing its temperature approximately 30° F. further, passing the admixture from the scraped surface heat exchanger to a holding tank and there holding it at a temperature substantially the same as the temperature of the scraped surface heat exchanger, introducing into said holding tank paraxylene crystals of higher purity and larger size than are formed from a mixture having the paraxylene concentration of said feed stock to serve as seed crystals and as a filter aid, removing slurry from said holding tank and subjecting it to a first centrifugal filtration step to separate a first filtrate and a first filter cake, melting said first filter cake to form a melt, chilling said melt to form a second slurry of paraxylene crystals, subjecting said second slurry to a second centrifugal filtration step to separate it into a second filtrate and a second filter cake and removing the filter cake as product.

2. A method in accordance with claim 1 in which crystals introduced into the holding tank are from the second filter cake.

3. A process for separating paraxylene from a feed stock consisting of a liquid mixture of hydrocarbons including paraxylene in the range of about 12 to 25% by volume and the isomers thereof including ortho and metaxylenes and ethylbenzene which comprises the steps of forming a first stream from said feed stock, chilling said first stream to a temperature within the range of −35 to −55° F. and above the crystal point of said feed stock, admixing said first stream with a second stream of slurry having a higher paraxylene content and a lower temperature to form an admixture having a temperature within the range of −65 to −75° F., passing said chilled mixture through a first scraped surface heat exchanger to reduce its temperature approximately 30° F. and in the range of −95° to −105° F., passing said chilled mixture into a holding tank, introducing into said holding tank large paraxylene crystals having an average size of 270 by 360 microns to serve as seed crystals and as a filter aid, withdrawing from said holding tank said second stream of slurry for admixture with said first stream and withdrawing from said holding tank an additional amount of slurry, subjecting said additional amount of slurry to a first centrifugal filtration step to separate a filtrate and a filter cake, removing said filter cake from said first centrifugal filtration step and melt it to form a first melt, subjecting said melt to a crystallization step to form a slurry of paraxylene crystals, subjecting said paraxylene crystals to a second centrifugal filtration step to form a second filtrate and a second filter cake, removing said second filter cake from said second centrifugal filtration step using a portion of said second filter cake as the paraxylene crystals introduced into said holding tank and withdrawing the remainder of the filter cake as a high paraxylene content product.

4. A process in accordance with claim 3 in which the paraxylene crystals introduced into the holding tank are an amount equivalent to about 10% of the filter cake formed in the first centrifugal filtration step.

5. A process for separating paraxylene from a feed stock consisting of a liquid mixture of hydrocarbons including paraxylene in the range of 12% to 25% by volume and the isomers thereof including ortho and metaxylenes and ethylbenzene which comprises the steps of chilling the feed stock in a first chilling zone to a temperature in the range of $-35°$ to $-55°$ F. close to but above its crystallization temperature, admixing said chilled feed stock with a slurry of substantially the same composition and at a lower temperature in the range of $-65°$ to $-75°$ F. to form an admixture having a temperature approximately $10°$ F below the crystallization temperature of said feed stock, subsequently reducing the temperature of the admixture in a second chilling zone approximately $30°$ F. further and then discharging it into a holding tank which is continuously stirred by mechanical means and holding it at substantially the outlet temperature of said second chilling zone, introducing into said holding tank paraxylene crystals having an average size of 270 by 360 microns and of higher purity and larger size than those formed by chilling said feed stock to serve as a filter aid and removing the resultant slurry from said holding tank and subjecting it to a first centrifugal filtration step to separate a filtrate and a filter cake.

6. A process for separating paraxylene from a feed stock consisting of a liquid mixture of hydrocarbons including paraxylene in the range of about 12% to 25% by volume and the isomers thereof including ortho and metaxylenes and ethylbenzene which comprises the steps of establishing from a portion of said feed stock a system consisting of a body of chilled slurry of paraxylene crystals and continuously circulating slurry components which are continuously withdrawn from said body, continuously passed through a scraped surface chiller and continuously returned to the body of chilled slurry, continuously mechanically stirring said body of chilled slurry to encourage crystal growth therein, continuously adding to said system a stream formed from a portion of said feed stock, continuously adding to said body of chilled slurry paraxylene crystals larger than the paraxylene crystals in said body, and continuously removing from said system portions of slurry and separating by centrifugal filtration from said portions of slurry paraxylene crystals as product.

7. A process for separating paraxylene from a feed stock consisting of a liquid mixture of hydrocarbons including paraxylene in the range of 12 to 25% by volume and the isomers thereof including ortho and metaxylene and ethylbenzene which comprises the steps of establishing from a portion of said feed stock a system consisting of a body of chilled slurry of paraxylene crystals and a stream containing slurry components which are continuously withdrawn from said body, continuously passed through a scraped surface chiller and continuously returned to the body of chilled slurry, maintaining slurry in said body for an average holding time within the range of 30 minutes to three hours and continuously mechanically agitating said body of chilled slurry to encourage crystal growth therein, continuously adding to said system additional portions of said feed stock, continuously adding to said body of chilled slurry paraxylene crystals larger than the paraxylene crystals in said body, continuously removing portions of slurry from said body of chilled slurry and separating by centrifugal filtration from said portions of slurry paraxylene crystals as product.

References Cited in the file of this patent
UNITED STATES PATENTS

| | | |
|---|---|---|
| 2,511,711 | Hetzner et al. | June 13, 1950 |
| 2,517,601 | Shafor et al. | Aug. 8, 1950 |
| 2,530,978 | Mason | Nov. 21, 1950 |
| 2,533,232 | Dressler | Dec. 12, 1950 |
| 2,623,903 | Weaver et al. | Dec. 30, 1952 |
| 2,651,665 | Booker | Sept. 8, 1953 |
| 2,672,487 | Tegge et al. | Mar. 16, 1954 |
| 2,688,045 | Powers et al. | Aug. 31, 1954 |

FOREIGN PATENTS

| | | |
|---|---|---|
| 392,829 | Great Britain | May 25, 1933 |

OTHER REFERENCES

Riegel: Chemical Machinery, Reinhold Publishing Corp., 1944, page 343.

Svanoe: J. Chem. Ed., page 549, October 1950.